(12) United States Patent
Dahan et al.

(10) Patent No.: US 12,143,494 B1
(45) Date of Patent: Nov. 12, 2024

(54) METHOD FOR INCREASING SECURITY LEVEL OF ONE-TIME-PASSWORD MESSAGE FORMATS

(71) Applicants: Meir Dahan, Tiberias (IL); Eliahu Antopolsky, Zichron Yaakov (IL)

(72) Inventors: Meir Dahan, Tiberias (IL); Eliahu Antopolsky, Zichron Yaakov (IL)

(*) Notice: Subject to any disclaimer, the term of this patent is extended or adjusted under 35 U.S.C. 154(b) by 0 days.

(21) Appl. No.: 18/738,014

(22) Filed: Jun. 9, 2024

(51) Int. Cl.
*H04L 9/32* (2006.01)
*G06F 21/60* (2013.01)

(52) U.S. Cl.
CPC .......... *H04L 9/3228* (2013.01); *G06F 21/606* (2013.01)

(58) Field of Classification Search
CPC .............................. H04L 9/3228; G06F 21/606
See application file for complete search history.

(56) References Cited

U.S. PATENT DOCUMENTS

| | | | |
|---|---|---|---|
| 11,115,213 B1* | 9/2021 | Marimuthu | G06F 21/42 |
| 2006/0236105 A1* | 10/2006 | Brok | H04W 12/50 |
| | | | 713/169 |
| 2018/0217968 A1* | 8/2018 | Bastide | G06F 40/169 |
| 2020/0127960 A1* | 4/2020 | Khawand | H04M 1/72448 |
| 2024/0211281 A1* | 6/2024 | Tang | G06F 9/451 |

FOREIGN PATENT DOCUMENTS

EP 3340546 A1 * 6/2018 ............. G06F 21/31

* cited by examiner

*Primary Examiner* — Robert B Leung

(57) ABSTRACT

The invention refers to a method for increasing a security level of one-time-password message format of an organization and for disabling displays of one-time-passwords on screens of smartphones in a state of locked-screen-preview. The method includes the steps of having a computer system of an organization on which the format is saved and used for sending one-time-passwords to smartphones of clients of the organization, redrafting the format or replacing the format with a new format to include at least one hundred and twenty characters from the beginning of the redrafted or the new format until the digits that comprise the one-time-password, and using the redrafted or the new format for sending one-time-passwords to smartphones of clients of the organization. By that, the one-time-passwords are disabled to be shown on the screens of the smartphones that are in a state of locked-screen-preview.

1 Claim, 2 Drawing Sheets

METHOD FOR INCREASING SECURITY LEVEL OF ONE-TIME-PASSWORD MESSAGE FORMATS

TECHNICAL FIELD

The present invention refers to a method for increasing security level of one-time-password message formats of organizations in order to disable a display of one-time-passwords on screens of smartphones that are set in a state of locked-screen-preview.

BACKGROUND ART

The static password is the most common authentication method and the least secure. The one-time password (OTP) is used for logging on to networks or services using a unique password that can only be used once. The one-time password, also known as a one-time PIN, one-time authorization code (OTAC) or dynamic password, is a password that is usually valid for a few minutes and valid for one login session or transaction, on a computer system or other digital device. The one-time password is used usually as a part of a two-factor authentication that includes the static (permanent password) and the one-time password that the user received as a part of a text message format to his mobile phone (that is sent to his mobile phone number as registered in the organization (Banks, for example)). The one-time password usually is a four to eight digit code that the user received to his mobile phone, for example, when he wants to make an online transaction in his bank account. It is customary, and this is done by almost all smartphone users, that the screen is automatically locked if the user does not touch the smartphone for a while or if he presses a certain button that locks the screen, and unlocking the screen is done by a personal code or by a fingerprint (or other biometric means of identification) and we will refer to this codes in this disclosure and in the claims with the term "personal code".

In the setting of almost every smartphone the user can choose how incoming text messages are displayed on the screen while the screen is locked. The user can choose that notifications will not appear on the screen when the screen is locked, or an empty notification will appear that only indicates that a text message has just arrived, but the sender and the content, not even a part of it, are not displayed. We will refer to this mode in this disclosure and in the claims with the term "completely-locked-screen" that means that the screen of the smartphone is locked; disable preview display of incoming text messages, and disable display of the incoming text messages of part of them after swiping down the screen.

The user can choose a mode (to set his smartphone) in which a snippet notification is displayed on the locked screen that comprises the first part of the incoming text message and we will refer to this mode in this disclosure and in the claims with the term "locked-screen-preview" that means that the screen of the smartphone is locked, enables a display of a preview (a first part of the text message) of the incoming text messages in a length of one hundred and twenty characters or less, and disable or limit further display of the incoming text messages after swiping down the screen t be shown in a length of one hundred and twenty characters or less. In this mode, it is possible to view the first part of the text message on the screen when the screen is locked and without a need to unlock the screen, means, without a need to use the personal code.

In the settings of many smartphones the user must choose one of the following sub-options: The text message is shown on the locked screen in full (or in part) after swiping down and we will refer to this mode in this disclosure and in the claims with the term "locked-screen-swiping" that means that the screen of the smartphone is locked, enables preview display of incoming text messages, and also enables further display of the incoming text messages after swiping down the screen. The user may choose that the messages will not be shown after swiping down (or will be shown with the same amount of characters as in the preview) and we refer to this mode in this disclosure and in the claims with the term "locked-screen-preview" as stated above, The length of the preview notifications, means the amount of charades that can be shown in the preview (and in the long preview after swiping down, when the smartphone is set like that), is determined usually by several factors, mainly, the operating system design and/or the device manufacturer customizations. Usually, in Apple™ (iOS™) devices the preview notification includes two to four lines with about one hundred twenty characters and in other devices (Android™) the preview notification includes one or two lines with about eighty characters. The term "characters" in this disclosure and in the claims means the letters, numbers, symbols, spaces, punctuation, dots, and even underline, etc.

However, it will be clarified that there are devices that display more or less characters, in the preview when the smartphones is in a state of locked-screen-preview, but in this disclosure and in the claims we use the number one hundred twenty that reflects and refers to majority of devices and users, to solve a general statistical potential problem and not a problem of each and every one of the user community.

The starting point of the use of one-time-passwords is that the smartphones are in the hands of the users (who are the clients, customers or the recipients of the organization), therefore it is assumed that one-time-passwords sent to them will reach their hands (their eyes) only, and not to another person who can make unauthorized and harmful use of these one-time-passwords. The term "client" or "clients" in this disclosure and in the claims refers to any person, individual or user who is a client, customer or a targeted recipient of the one-time-password sent by the organization.

There may be cases, rare or less rare, in which a third party will have access to the static password and the user name of the user that will enable access to a service (for example, making a money transfer from the user's bank account) and also for that third party to have physical access to the user's smartphone, for example: people who live together in student dormitories and when the user enters the shower, for example, then the smartphone may be visible on the table in the room, people working together and when the user leaves the room and can leave the smartphone on his desk, family members who live together, a group of people on an organized trip, soldiers, etc. in cases where a third party can be near the user's smartphone when the user is away for several minutes or more. In these cases, when a text message arrives with the one-time-password, then the one-time-password itself can be displayed on the screen, without the need to unlock the locked screen by the personal code, and this is a security breach, which the present invention comes to solve.

DESCRIPTION OF THE DRAWINGS

The intention of the drawings attached to the application is not to limit the scope of the invention and its application.

The drawings are intended only to illustrate the invention and they constitute only one of its many possible implementations.

THE INVENTION

Figure 1:
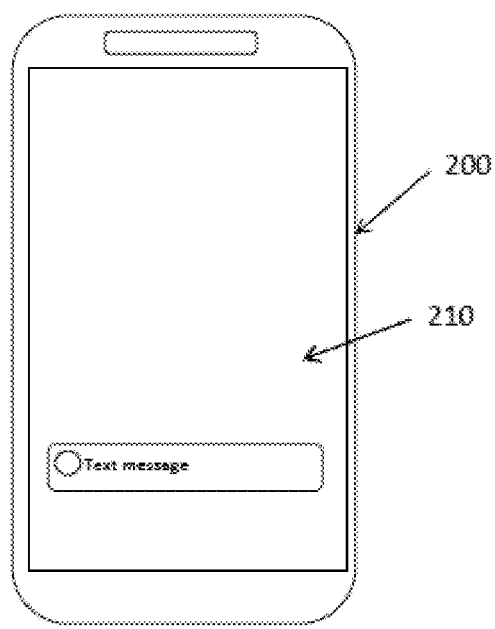
FIG. 1 depicts a smartphone (200) in a state of completely-locked-screen with a notification on its screen (210).

The main objective of the present invention is to provide a computer-implemented method for increasing the security level of a one-time-password message format (100) of an organization and for disabling or limiting a display of a one-time-password on the touch screens (210) of a smartphone (200) that is set in a state of locked-screen-preview. The term "organization" in this disclosure and the claims means any person (in its legal sense, not only an individual), including banks, credit card companies, financial entities, insurance companies, business entities, government entities, municipal entities, and any entity that sends text messages with one-time-passwords.

The method is performed by a processing device (11) (one or more) running on a computer system (10) of the organization. The term "computer system of the organization" refers to any computer that operates and assists sending the text messages with one-time-passwords, including computers of the organization, of third parties that are used to provide service to the organization for saving or sending the messages, including computers where the format of the message is saved, computers from which the format is sent as concrete messages to clients, or the computers that produce the one-time-passwords.

The computer-implemented method includes one or more of the following steps: Have the computer system of the organization on which the one-time-password message format (100) is saved and used for sending the one-time-passwords from this computer system to smartphones (200) of the clients of the organization.

The organization may have one or more one-time-password message formats, each for a specific enablement. A bank, for example, may have a one-time-password message format specifically for enabling the client to enter his personal area on the bank's website, it may have a format for specifically enabling the client to make money transfer from his account to an account of a third party, and it can have a format specifically for confirming and enabling an execution of a money transfer that exceeds a certain amount. The term "one-time-password message format" in this disclosure and in the claims in this respect means a one-time-password message format for each specific enablement.

Redraft, by the computer system of the organization, the saved one-time-password message format to comprise from the beginning (21) of the redrafted one-time-password message format (20) until the (beginning of the) (22) one-time-password itself (the digests that comprise this password in a text message that is sent on the basis of this format) at least one hundred and twenty characters, or replace, by the computer system, the saved one-time-password message format with a new one-time-password message format (30) that comprises from the beginning (31) of the new one-time-password message format until the (digits that comprise the password in a text message that is sent on the basis of this format) (32) one-time-password at least one hundred twenty characters. We chose the number of at least one hundred twenty characters, to address a wide range of options, although not necessarily to cover an existing option, as explained in the background, and also to leave a room for other text messages to be viewed on the licked-screen without forcing the user to use his personal code.

Use, by the computer system, the redrafted one-time-password message format (20) or the new one-time-password message format (30) for sending one-time-passwords to the smartphones (200) of the clients of the organization.

By implementing this method the organization in fact disables or limits a display of the one-time-passwords that are sent according to the redrafted or the new one-time-password formats on the screens of the smartphones of the clients that are in a state of locked-screen-preview (means that the screen of the smartphone are locked, enables preview display of incoming text messages in the number of less than one hundred and twenty characters, and disables or limits further display of the text messages even after swiping down the screen).

Clients that their smartphones are in the state of completely-locked-screen are anyway protected from the option described in the background. Clients that their smartphones are in the state of locked-screen-swiping are hardly can be protected from the option described in the background due to the fact that most smartphones enable a full message to be displayed on the locked screen after swiping down. The implementation of the method of the present invention comes to solve this problem to users (clients) that their smartphones are in the state of locked-screen-preview, by making the text message longer than the length of the preview and by that disabling the option to view it without using the personal code. Forcing the use of the personal code in this situation (when the smartphone is in the state of locked-screen-preview) upgrade the security level of the one-time-password format.

The implementation of the method of the present invention also increase authenticity of use of the one-time-passwords sent from the computer system of the organization, and increase reliability of this usage, limits the possibility of third party to view (to see) the one-time-password itself (the digits) without the presence of the user (the client), and adds an additional layer of security to validate the online actions of users in websites and online platforms of the organization.

Figure 2:
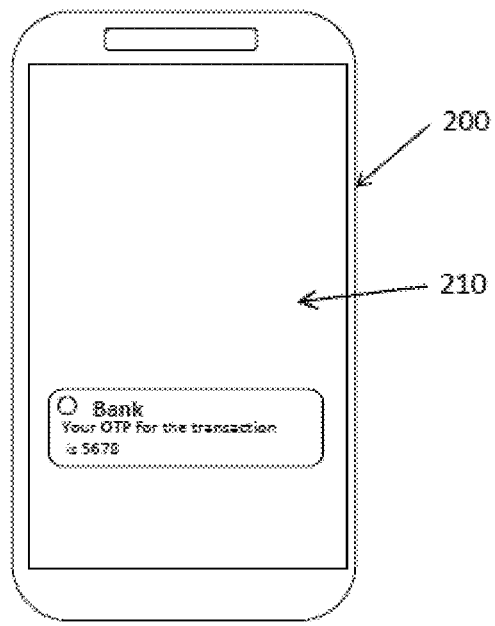
FIG. 2 depicts a smartphone (200) in a state of locked-screen-preview with a preview of a text message with a one-time-password received from a bank.
Figure 3:
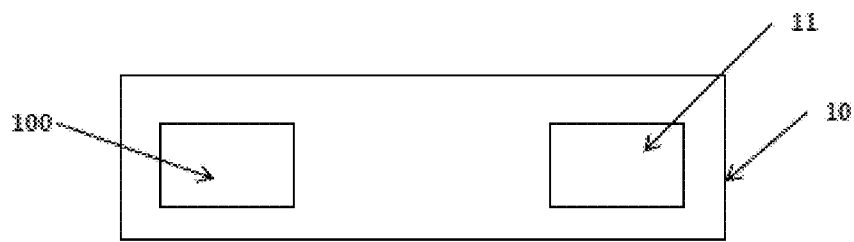
FIG. 3 is a schematic depiction of the commuter system (10) of the organization with the processing device (11) and the saved one-time-password message format (100).

FIG. 1 depicts a smartphone (200) in a state of completely-locked-screen with a notification on its screen (210) that notifying him that he received a text message. FIG. 2 depicts a smartphone (200) in a state of locked-screen-preview with a preview of a text message with a one-time-password received from a bank. FIG. 3 is a schematic depiction of the commuter system (10) of the organization with the processing device (11) and the saved one-time-password message format (100).

Figure 4:
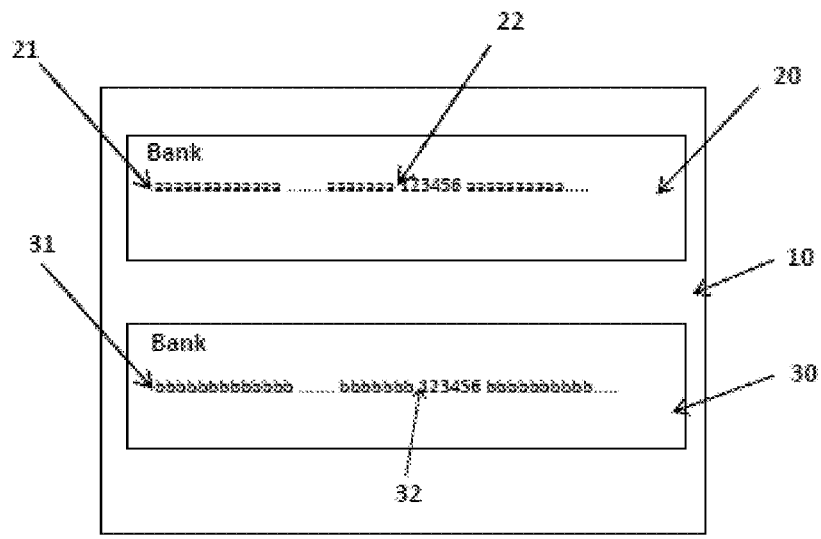
FIG. 4 is a schematic depiction of the redrafted and the new one-time-password message formats (20) and (30).

FIG. 4 is a schematic depiction of the redrafted one-time-password message format (20) and of the new one-time-password message format (30). Instead of real words we present the text with the letter "a" or "b" and also not 120 characters but less to enable more efficient graphic depiction.

What is claimed is:

1. A method for enhancing a security of a one-time-password (OTP) message format when used for sending OTPs to smartphones in a locked-screen-preview state, the method comprising:

providing a computer system on which an OTP message format is stored, wherein the stored OTP message format does not include at least one hundred and twenty characters before digits comprising the OTP;

redrafting, by the computer system, the stored message format to include at least one hundred and twenty characters before the digits comprising the OTP, or replacing the stored message format with a new message format that includes at least one hundred and twenty characters before said digits;

sending, by the computer system, OTPs to smartphones using the redrafted or new message format; and wherein the inclusion of at least one hundred and twenty characters before the OTP digits in the redrafted or new message format is configured to prevent the display of the OTP digits on smartphones in a locked-screen-preview state.

* * * * *